US012627651B2

(12) United States Patent
Sethia et al.

(10) Patent No.: US 12,627,651 B2
(45) Date of Patent: May 12, 2026

(54) SECURE PASSWORD LESS CRITICAL COMPUTING INFRASTRUCTURE ACCESS COMMUNICATION NETWORK PROTOCOL

(71) Applicant: BANK OF AMERICA CORPORATION, Charlotte, NC (US)

(72) Inventors: Maneesh Kumar Sethia, Hyderabad (IN); Shailendra Singh, Thane West (IN); Vasantha Lakshmi Meenakshi Sundararajan, Chennai (IN); Gowri Sundar Suriyanarayanan, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 90 days.

(21) Appl. No.: 18/592,735

(22) Filed: Mar. 1, 2024

(65) Prior Publication Data

US 2025/0279992 A1    Sep. 4, 2025

(51) Int. Cl.
H04L 9/40 (2022.01)

(52) U.S. Cl.
CPC ................................. H04L 63/083 (2013.01)

(58) Field of Classification Search
CPC ..... H04L 63/083; H04L 9/3226; H04L 63/32; H04W 12/069
See application file for complete search history.

(56) References Cited

U.S. PATENT DOCUMENTS

| | | | |
|---|---|---|---|
| 8,370,435 B1 | 2/2013 | Bonefas et al. | |
| 8,386,641 B2 | 2/2013 | Vange et al. | |
| 8,418,233 B1 | 4/2013 | Hughes | |
| 8,442,506 B2 | 5/2013 | Peacock | |
| 8,463,912 B2 | 6/2013 | Bharadwaj | |
| 8,510,468 B2 | 8/2013 | Vange et al. | |

(Continued)

OTHER PUBLICATIONS

S. Mohammadali Zanjani et al., "Securing the Internet of Things via Blockchain-Aided Smart Contracts", 2022, pp. 1-8 (Year: 2022).*

(Continued)

*Primary Examiner* — Luu T Pham
*Assistant Examiner* — Canh Le
(74) *Attorney, Agent, or Firm* — Moore & Van Allen PLLC; Nicholas C. Russell

(57) ABSTRACT

Systems, computer program products, and methods are described herein for a password less service identification protocol (PLSI). The PLSI protocol is a protocol and procedures that allow access to the full security layer of the critical computing infrastructure for complete secure access. There are four processes associated with the PLSI protocol including access initiation, PLSI service identification generation, PLSI handshake process, and PLSI service identification destruction. The secure password less critical computing infrastructure access communication network protocol can be used to utilize secure connection devices, to access critical production servers or databases where in the required security and compliance to segregation of duty based on entitlement, to establish a secure connection between two or more autonomous devices initiating, to establish secure connection on distributed cloud infrastructure, and/or to access node in block chain network to process the transaction.

20 Claims, 7 Drawing Sheets

(56)  References Cited

U.S. PATENT DOCUMENTS

| | | | |
|---|---|---|---|
| 8,533,308 B1 | 9/2013 | Rothstein | |
| 8,543,665 B2 | 9/2013 | Ansari et al. | |
| 8,631,474 B2 | 1/2014 | Brown et al. | |
| 8,713,089 B2 | 4/2014 | Murphy et al. | |
| 8,898,340 B2 | 11/2014 | Vange et al. | |
| 8,977,711 B2 | 3/2015 | Vange et al. | |
| 8,977,712 B2 | 3/2015 | Vange et al. | |
| 9,723,105 B2 | 8/2017 | Vange et al. | |
| 10,154,115 B2 | 12/2018 | Vange et al. | |
| 10,819,826 B2 | 10/2020 | Vange et al. | |
| 11,632,360 B1 * | 4/2023 | Tan | G06F 3/0622 |
| | | | 726/4 |
| 12,126,995 B2 * | 10/2024 | Hua | G16H 40/67 |
| 12,367,486 B2 * | 7/2025 | Ranganathan | H04L 63/0815 |
| 12,462,246 B1 * | 11/2025 | Witchey | H04L 9/3213 |
| 2007/0203742 A1 * | 8/2007 | Jones | G06Q 10/10 |
| | | | 600/300 |
| 2011/0041009 A1 * | 2/2011 | Hom | G06F 11/076 |
| | | | 714/E11.023 |
| 2015/0341383 A1 * | 11/2015 | Reddy | H04L 63/0876 |
| | | | 726/22 |
| 2019/0166108 A1 | 5/2019 | Larson et al. | |
| 2022/0309037 A1 * | 9/2022 | Gutierrez | G06F 16/16 |
| 2022/0343003 A1 * | 10/2022 | Kumar | G06F 21/62 |
| 2023/0394495 A1 * | 12/2023 | Abdelsamie | G06Q 30/018 |
| 2023/0394897 A1 * | 12/2023 | Schlicht | H04W 12/0471 |
| 2023/0412587 A1 * | 12/2023 | Swaminathan | H04L 63/20 |
| 2024/0320641 A1 * | 9/2024 | Gassel | G06Q 20/108 |
| 2025/0016160 A1 * | 1/2025 | Konovalov | H04L 63/101 |
| 2025/0061457 A1 * | 2/2025 | Basu | G06F 40/174 |
| 2025/0181740 A1 * | 6/2025 | Hochmuth | G06F 21/6218 |
| 2025/0190369 A1 * | 6/2025 | Wright | G06F 21/54 |
| 2025/0232050 A1 * | 7/2025 | Buchan | G06F 21/6218 |

OTHER PUBLICATIONS

Dimitris Geneiatakis et al,. "Survey of Security vulnerabilities in session initiation protocol," 2006, pp. 1-4 (Year: 2006).*

* cited by examiner

REQUEST FOR CRITICAL COMPUTING INFRASTRUCTURE ACCESS USING PASSWORD LESS
SERVICE IDENTIFICATION (PLSI) PROTOCOL
202

PLSI SERVICE IDENTIFICATION GENERATION
204

PLSI HANDSHAKE
206

PLSI SERVICE IDENTIFICATION DESTRUCTION
208

SECURE PASSWORD LESS CRITICAL COMPUTING INFRASTRUCTURE ACCESS COMMUNICATION NETWORK PROTOCOL

BACKGROUND

With advancements in technology and continued growth of network infrastructures required for entity management, it is critical to protect access to critical computing infrastructures. Currently, these critical computing infrastructures are accessed by using a service identification and a randomly generated password. However, a need exists for a secure password less critical computing infrastructure access communication network protocol.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Entity users requiring infrastructure access are typically required to input a service identification with a password to gain infrastructure access. The password is usually generated based on a password generation mechanism. However, this method leaves entity infrastructures vulnerable to misappropriation and bad actor access if the actor understands the pattern of passwords generated by a generation mechanism. Even though the passwords are generated randomly, when a login attempt occurs the system uses password authentication protocol that directly sends the generated password in data packets for server authentication. This transmission of data packets may be vulnerable for third party access and misappropriation. Furthermore, when third party password generation mechanisms are used, those third parties may obtain information about server IP and login information for the entity computing infrastructure that may also be vulnerable. In light of this, using the third-party tools need to be constantly monitored by the entity to avoid any data leakage, which adds complexity, computing power, and expenses in protecting critical computing infrastructure access.

Embodiments of the invention relate to systems, methods, and computer program products for secure password less critical computing infrastructure access communication network protocol, the invention comprising: receiving a request for critical computing infrastructure access using password less service identification (PLSI) protocol; generating a PLSI service identification for a user from a client device; providing the PLSI service identification to the user, wherein the PLSI service identification comprises a tag with access request information, client identification, a generated digest, and access duration; performing a PLSI handshake upon user input using the PLSI service identification; upon validation of the PLSI service identification, generating a new encrypted connection for the user to use the client device to access the critical computing infrastructure; and destructing the PLSI server identification upon completion of the new encrypted connection or upon a completion of a pre-determined amount of time.

In some embodiments, generating the PLSI service identification for the user from the client device further comprises: transmitting an access request number, an official client identification, and an access duration window to a service identification management server; generating a digest using a customizable digest generator based on any random service identification data previously used; tagging access request information, client identification, the generated digest, and access duration to the PLSI service identification; and transmit the access request information to the client device of the user.

In some embodiments, the customizable digest generator reviews a database layer, reviews previous application changes, reviews user pervious application inputs, and reviews any client identification information to generate a digest from randomly selected data from the reviews.

In some embodiments, generating the new encrypted connection for the user to use the client device to access the critical computing infrastructure further comprises: encrypting all data and commends that are executed via the new encrypted connection with a generated digest; and monitoring response operations taking place during the access window by the user.

In some embodiments, the PLSI handshake further comprises: transmitting the PLSI service identification to a service identification management server to decrypt the PLSI service identification using the generated digest and the PLSI service identification; and validating the PLSI service identification and extracting data using the generated digest.

In some embodiments, the request for critical computing infrastructure access is a request from a user or client associated with an entity and the request is for access to a database or server to perform maintenance or upgrading during a predetermined time period.

In some embodiments, the request for critical computing infrastructure access further comprises information on a server to be accessed, what is being performed on the critical computing infrastructure, user information, and the client machine information associated with the access request.

In some embodiments, transmitting the access request information to the client device of the user requires user input of PLSI<Unique Server ID>Login.

In some embodiments, the secure password less critical computing infrastructure access communication network protocol provides limited access to a full security layer of the critical computing infrastructure and creates a secure connection to: (1) independent internet-of-things (IOT) devices, (2) establish a secure connection between two or more autonomous IOT devices initiating, (3) establish secure connection on distributed cloud infrastructure, and/or (4) access node in block chain network to process the transaction.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
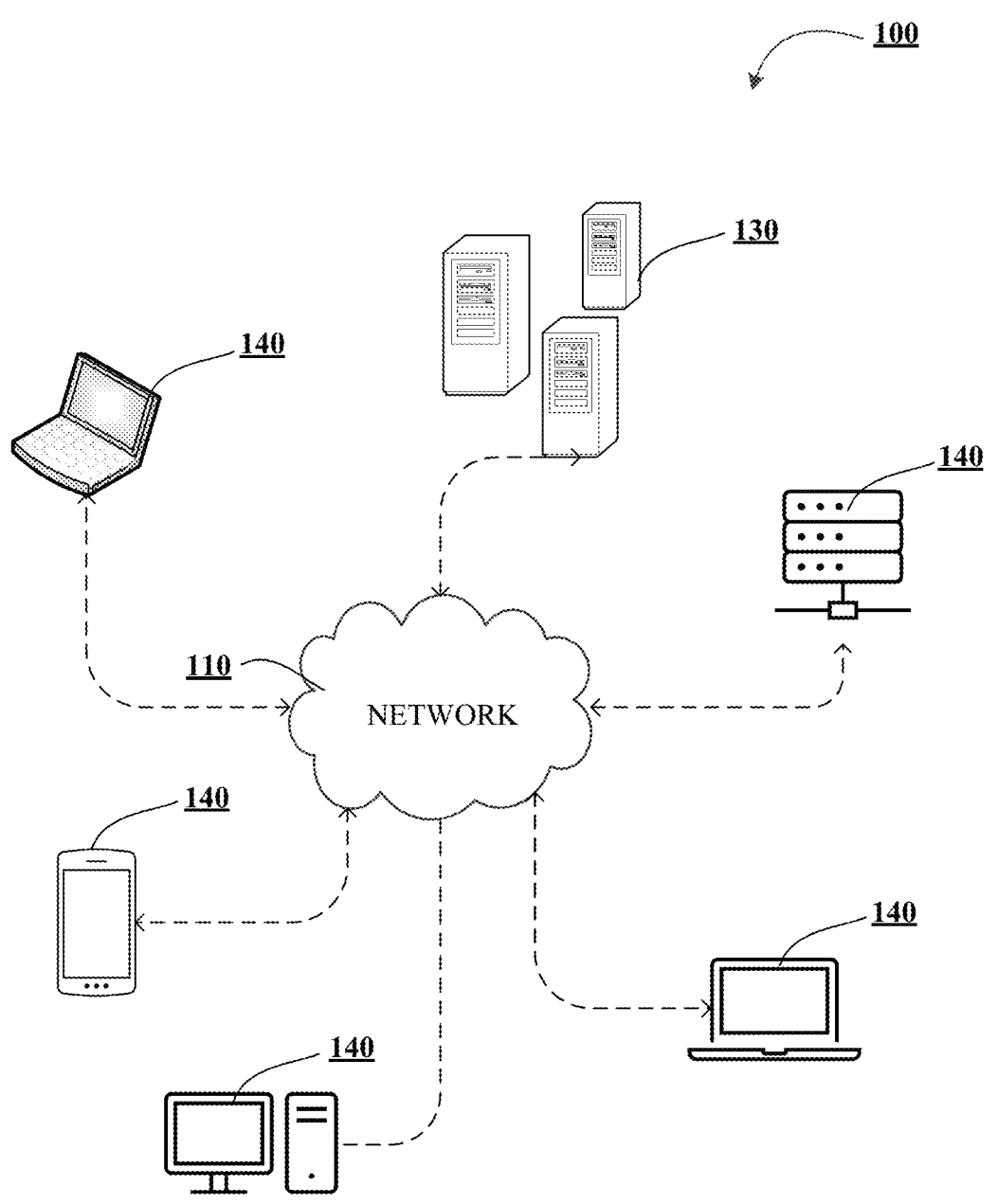
Figure 1B:
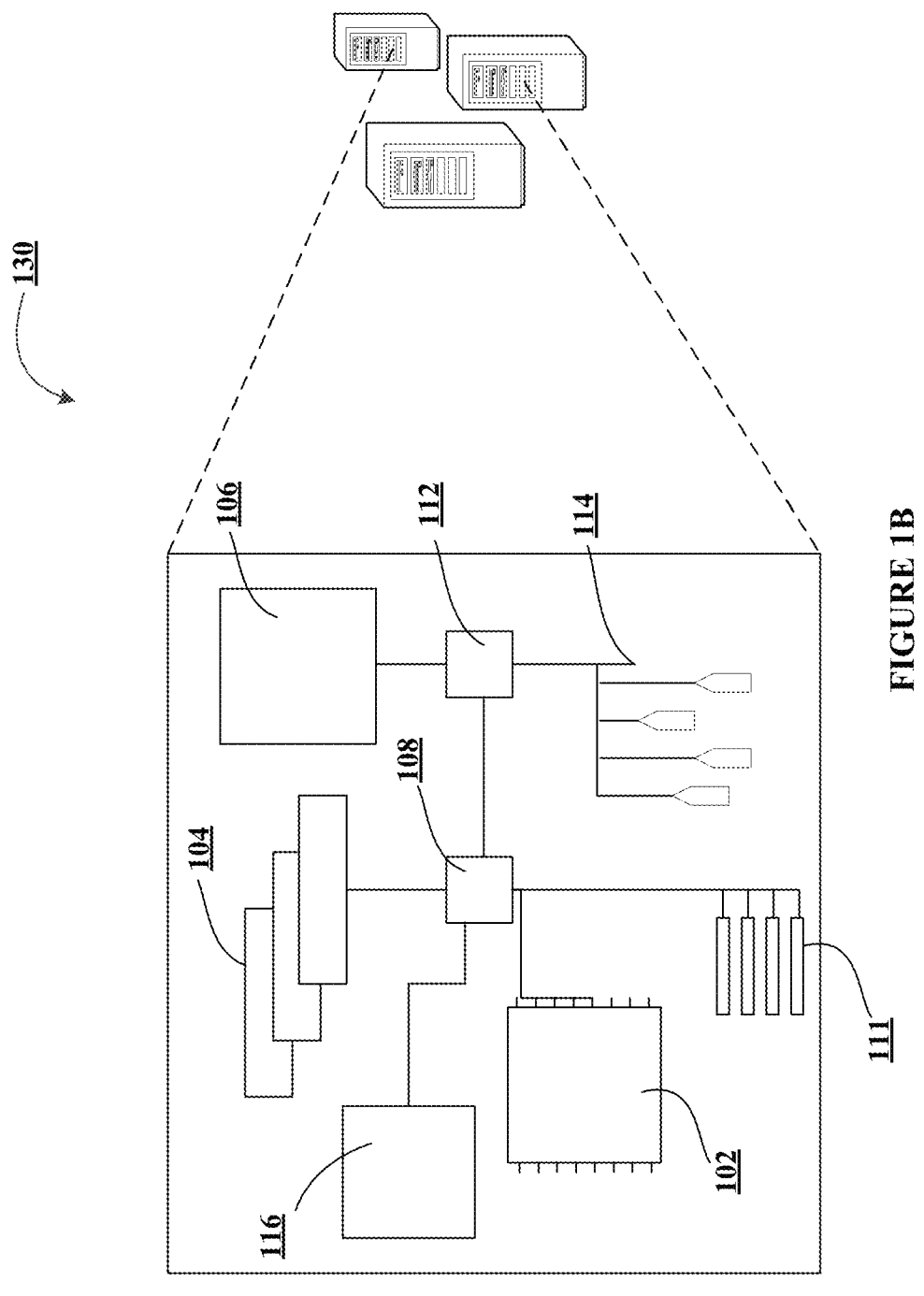
Figure 1C:
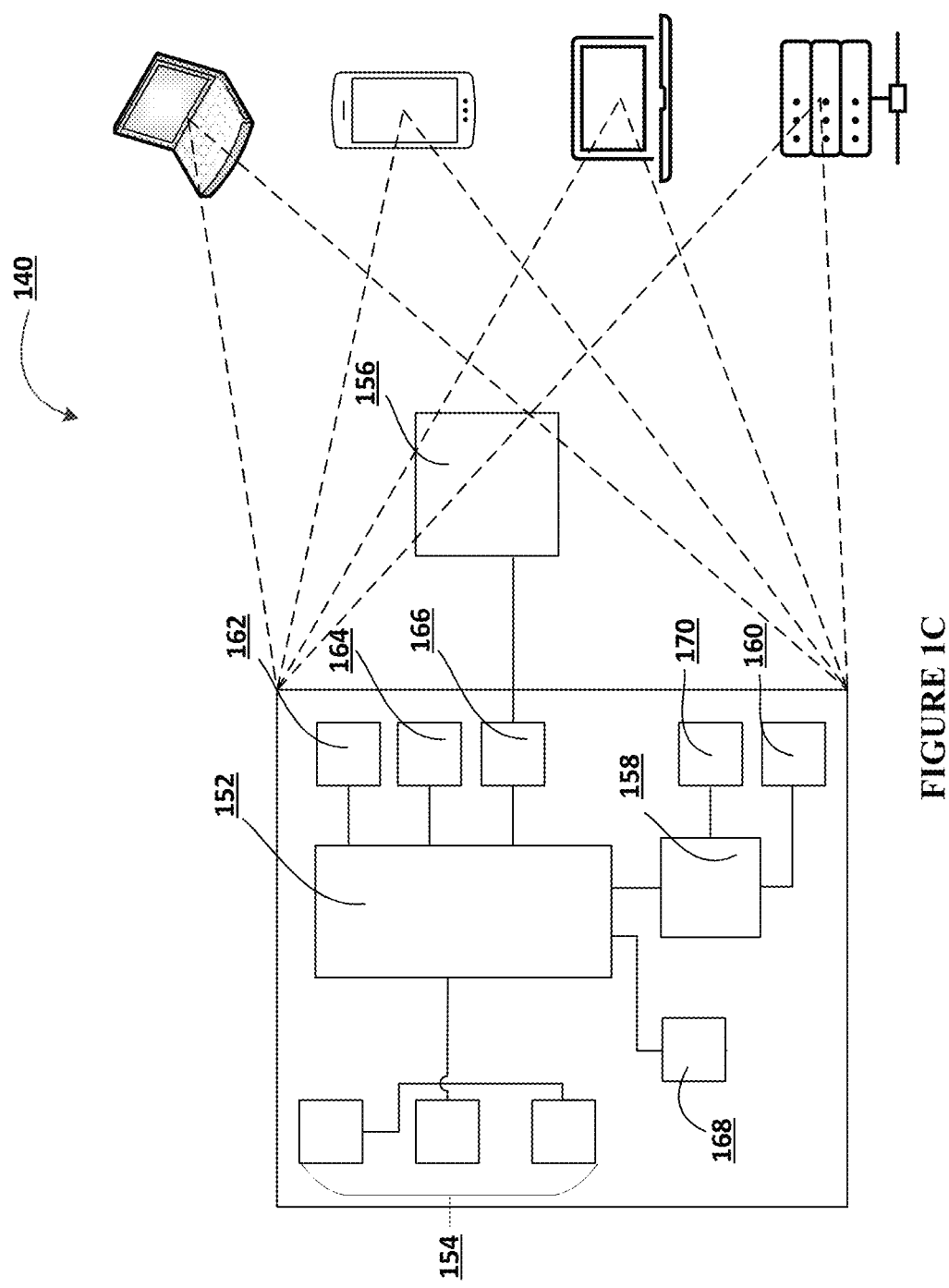
Figure 2:
Figure 2:
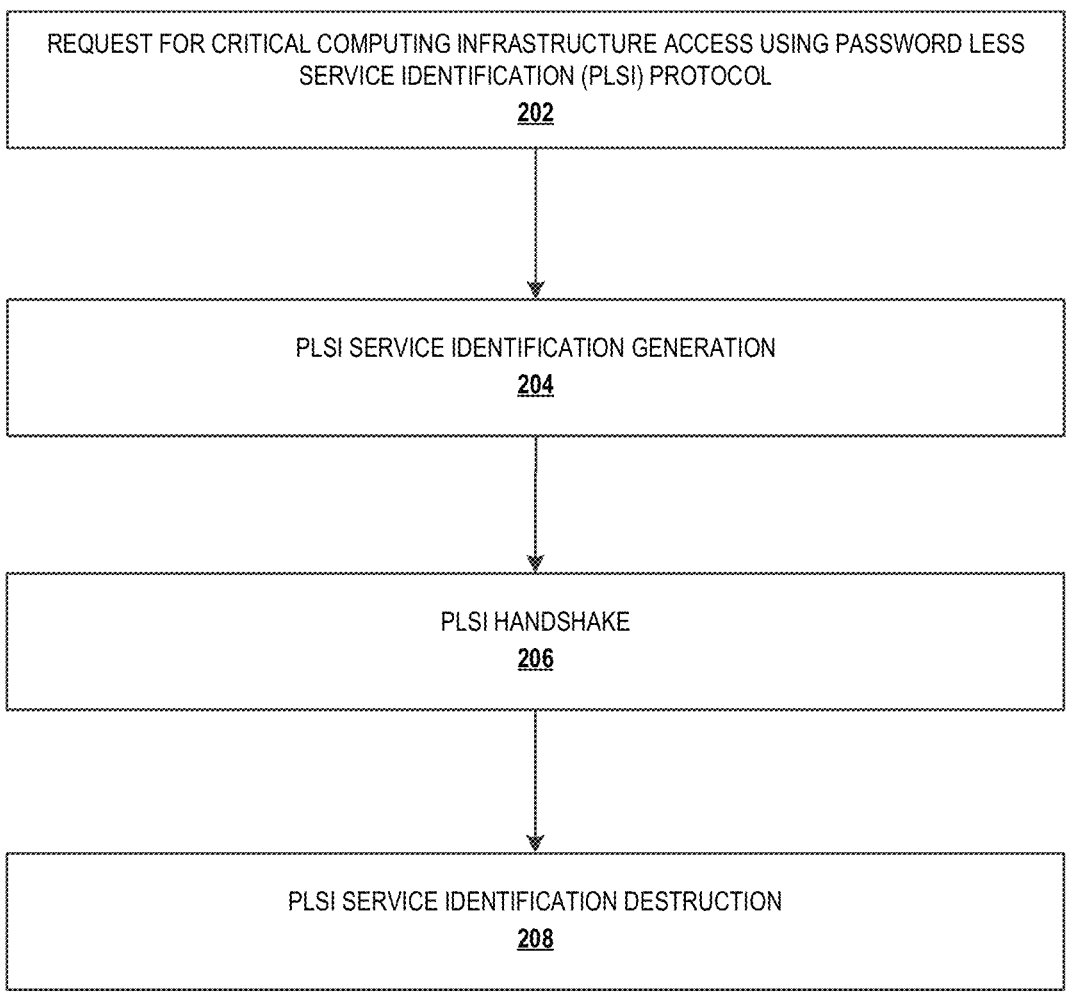
Figure 3:
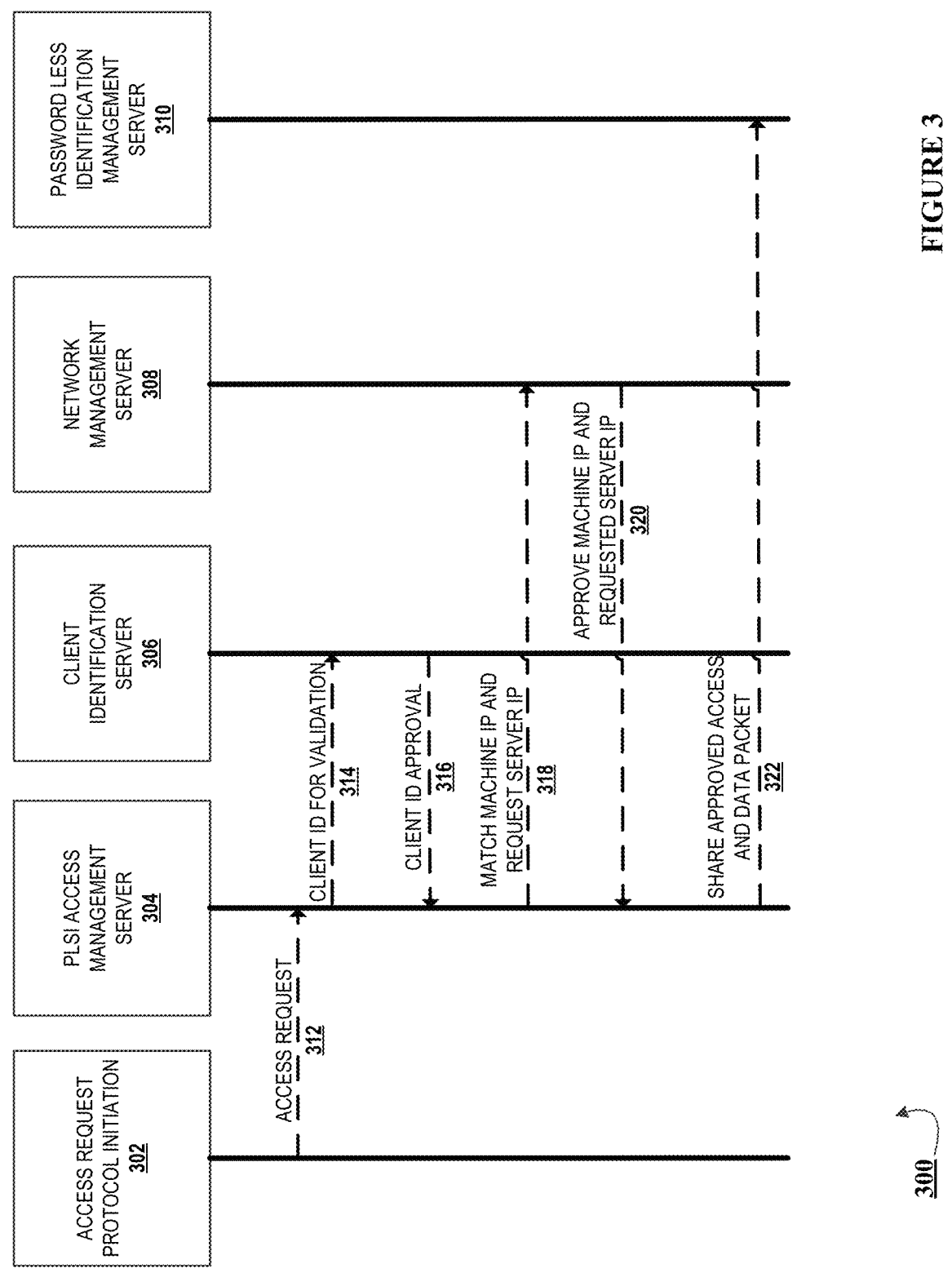
Figure 4:
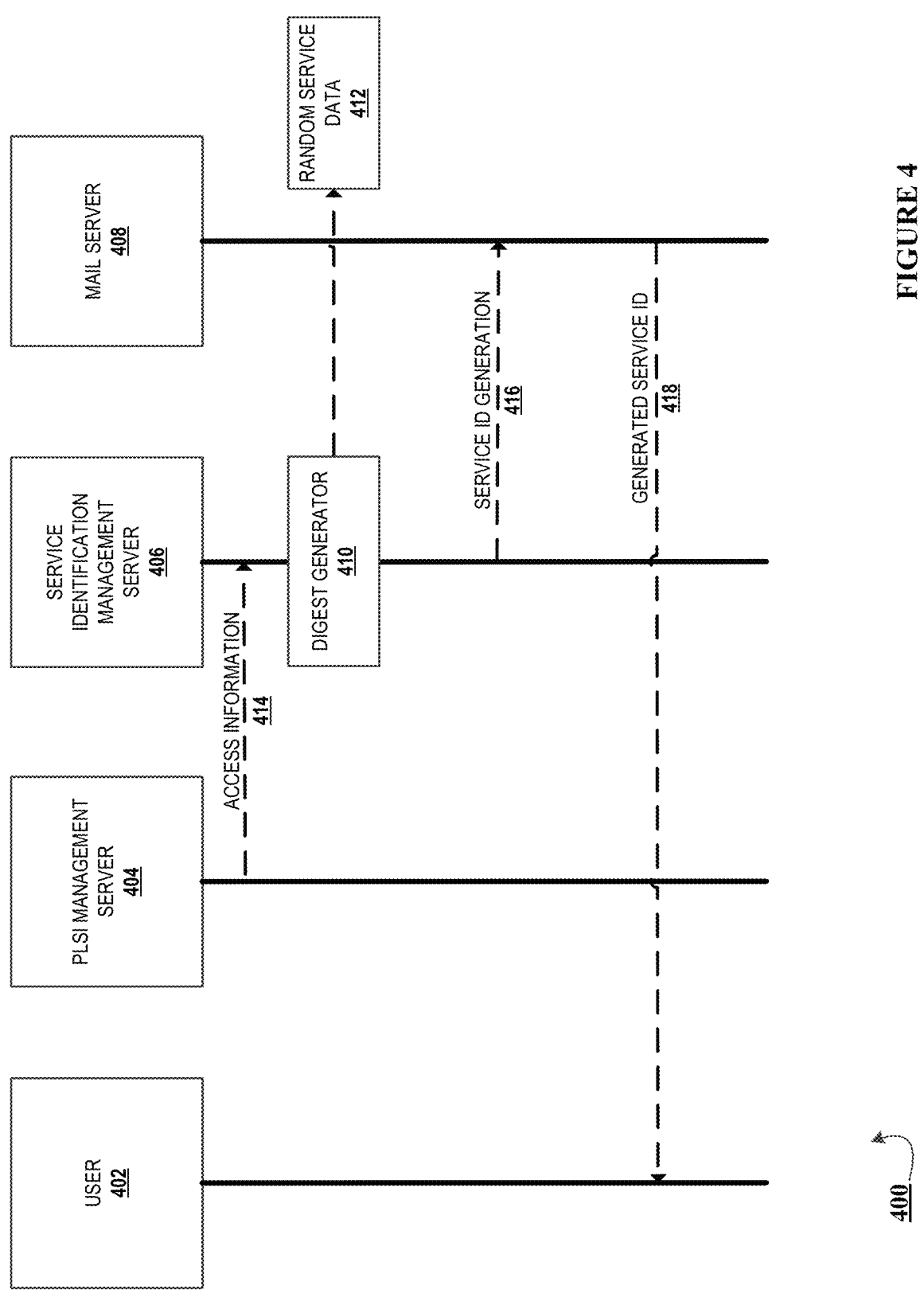
Figure 5:
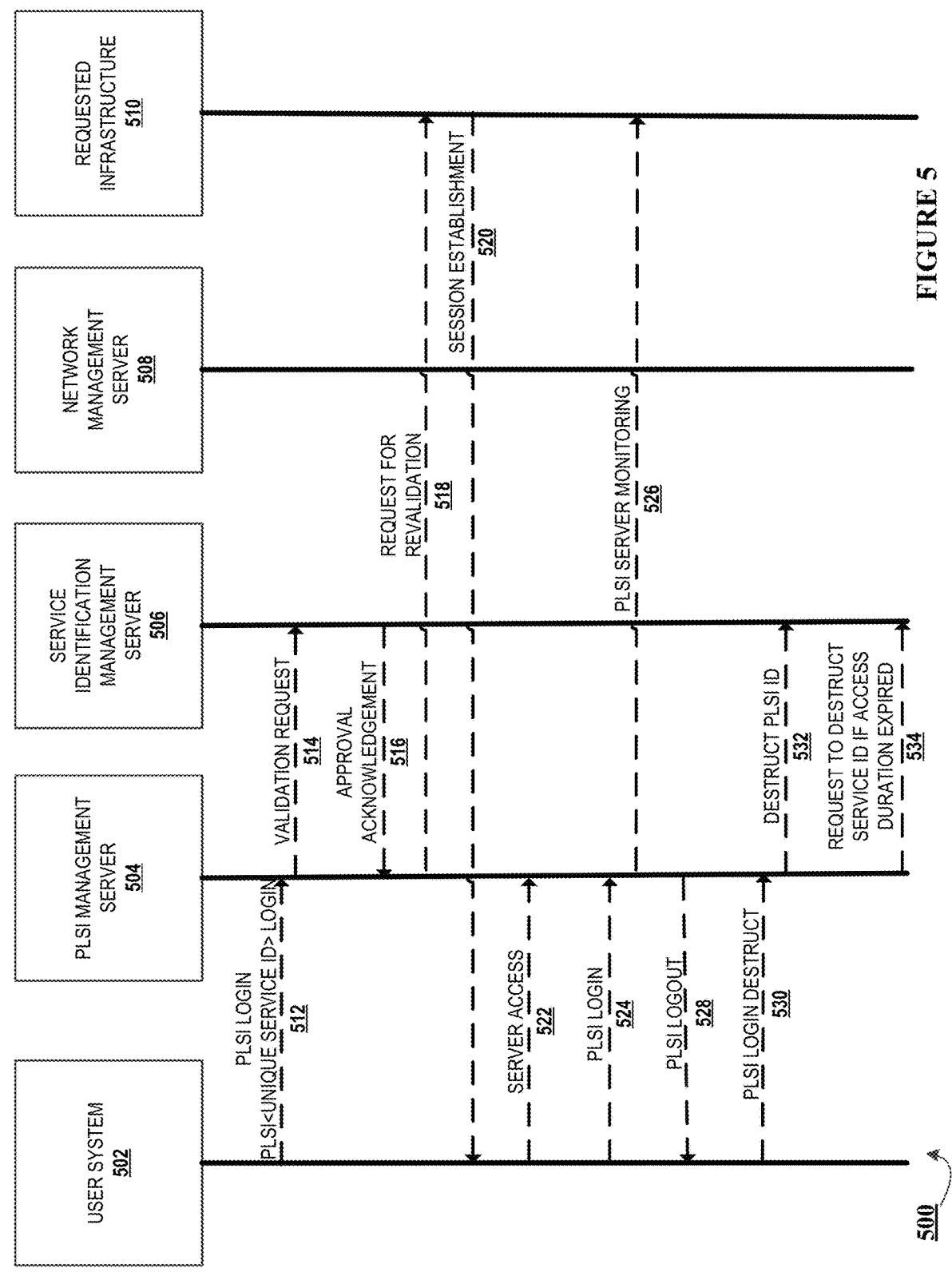

Having thus described embodiments of the invention in general terms, reference will now be made the accompanying drawings, wherein:

FIGS. 1A-1C illustrates technical components of an exemplary distributed computing environment for the secure password less critical computing infrastructure access communication network protocol in accordance with an embodiment of the invention;

FIG. 2 illustrates a process flow for the secure password less critical computing infrastructure access communication network protocol, in accordance with an embodiment of the invention;

FIG. 3 illustrates a process flow for the access initiation phase of the secure password less critical computing infrastructure access communication network protocol, in accordance with an embodiment of the invention;

FIG. 4 illustrates a process flow for the PLSI service identification generation phase for the secure password less critical computing infrastructure access communication network protocol, in accordance with an embodiment of the invention; and FIG. 5 illustrates a process flow for the handshake phase of the secure password less critical computing infrastructure access communication network protocol, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, other authentication information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

Entity users requiring infrastructure access are typically required to input a service identification with a password to gain infrastructure access. The password is usually generated based on a password generation mechanism. However, this method leaves entity infrastructures vulnerable to misappropriation and bad actor access if the actor understands the pattern of passwords generated by a generation mechanism. Even though the passwords are generated randomly, when a login attempt occurs the system uses password authentication protocol that directly sends the generated password in data packets for server authentication. This transmission of data packets may be vulnerable for third party access and misappropriation. Furthermore, when third party password generation mechanisms are used, those third parties may obtain information about server IP and login information for the entity computing infrastructure that may also be vulnerable. In light of this, using the third-party tools need to be constantly monitored by the entity to avoid any data leakage, which adds complexity, computing power, and expenses in protecting critical computing infrastructure access.

Instead of passwords, generate protocol with service identification along to access the full security layer that also protects from third-party access, data leakage and other vulnerabilities. The password less service identification protocol (PLSI) is created as a protocol and procedures that allow access to the full security layer of the critical computing infrastructure for complete secure access. There are four processes associated with the PLSI protocol including access initiation, PLSI service identification generation, PLSI handshake process, and PLSI service identification destruction. The secure password less critical computing infrastructure access communication network protocol can be used to utilize secure connection to independent internet-of-things (IOT) devices, to access critical production servers or databases where in the required security and compliance to segregation of duty based on entitlement, to establish a secure connection between two or more autonomous IOT devices initiating and executing payment transactions, to establish secure connection on distributed cloud infrastructure, and/or to access node in block chain network to process the transaction.

What is more, the present invention provides a technical solution to a technical problem. As described herein, the technical problem includes leaving entity infrastructures vulnerable to misappropriation by using random password generation software to access critical computing infrastructures. The technical solution presented herein allows for secure encrypted access to critical computing infrastructure with a secure password less communication network protocol that prevents storage, misappropriation, or the like of access information. In particular, the secure password less critical computing infrastructure access communication network protocol is an improvement over existing solutions to the authentication, validation, logging, and access to critical computing infrastructure of an entity, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for the secure password less critical computing infrastructure access communication network protocol 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The system 130 comprises several components of the secure password less critical computing infrastructure access communication network protocol. The components further comprise the password less service identification (PLSI) access management server, the client identification server, network management server, the PLSI identification management server, and the service identification management server. Each of these servers and their functions may be further described below in reference to FIGS. 3-5.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

The secure password less critical computing infrastructure access communication network protocol allows access to critical computing infrastructure of an entity. As such, the distributed computing environment 100 interacts with the critical computing infrastructure of an entity such as servers, databases, network components, and the like. These critical computing infrastructure components are not illustrated in FIG. 1A, however one of ordinary skill in the art will appreciate that the distributed computing environment 100 interacts with and allows access to the critical computing infrastructure components of an entity.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 106, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

The system 130 comprises several components of the secure password less critical computing infrastructure access communication network protocol. The components further comprise the password less service identification (PLSI) access management server, the client identification server, the network management server, the PLSI identification management server, and the service identification management server. The PLSI access management server manages the access initiation phase of the secure password less critical computing infrastructure access communication network protocol. The client identification server is a server associated with the entity device that the user is using to make the request. This server may be associated with a user device or end-point device 140 associated with the user requestion access. The network management server validates and allows access to the critical computing infrastructure of the entity. The PLSI identification management server validates a PLSI service identification for access to the critical computing infrastructure. The service identification management server is utilized to complete the handshake process.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for the secure password less critical computing infrastructure access communication network protocol 200, in accordance with an embodiment of the invention. As discussed, entity users requiring infrastructure access are typically required to input a service identification with a password to gain infrastructure access. The password is usually generated based on a password generation mechanism. However, this method leaves entity infrastructures vulnerable to misappropriation and bad actor access if the actor understands the pattern of passwords generated by a generation mechanism. Even though the passwords are generated randomly, when a login attempt occurs the system uses password authentication protocol that directly sends the generated password in data packets for server authentication. This transmission of data packets may be vulnerable for third party access and misappropriation. Furthermore, when third party password generation mechanisms are used, those third parties may obtain information about server IP and login information for the entity computing infrastructure that may also be vulnerable. In light of this, using the third-party tools need to be constantly monitored by the entity to avoid any data leakage, which adds complexity, computing power, and expenses in protecting critical computing infrastructure access, such as servers, clouds, databases, and the like. that are sensitive to the entity.

Instead of passwords, the system generates a protocol with a service identification alone to access the full security layer. This also prevents and protects from third-party access, data leakage, and other vulnerabilities. The password less service identification (PLSI) protocol is created as a protocol and procedures that allow access to the full security layer of the critical computing infrastructure for complete secure access. There are four processes associated with the PLSI protocol including access initiation 202, PLSI service identification generation 204, PLSI handshake process 206, and PLSI service identification destruction 208. The secure password less critical computing infrastructure access communication network protocol can be used to utilize secure connection to independent internet-of-things (IOT) devices, to access critical production servers or databases where in the required security and compliance to segregation of duty based on entitlement, to establish a secure connection between two or more autonomous IOT devices initiating and executing payment transactions, to establish secure connection on distributed cloud infrastructure, and/or to access node in block chain network to process the transaction.

As illustrated in block 202, the process 200 is initiated by a request for critical computing infrastructure accessing using password less service identification protocol. The access initiation phase is the initiation of the request for access to a critical computing infrastructure for the entity. A user may request to access a critical computing infrastructure to perform a patch, maintenance, update, installation, or the like. The user will request access via the PLSI access management server. The access request is submitted by the user with information on which servers are planned to be accessed, what the assess is for, who the users are that are going to access the serves, and the client machine information associated with the access request. The client machine is the entity machine and entity network information that the user is using as the end-point device to make the request. The PLSI protocol is then initiated upon validation. The system gives approval for generation of the PLSI service identification for the user.

Next, as illustrated in block 204, the process 200 continues by performing the PLSI service identification generation protocol. Prior to the access window, being the time and day that the user is performing the work on the critical computer infrastructure of the entity, the PLSI server transmits an access request number, an official client identification, and an access duration window to the service identification management server. A customizable digest generator associated with the service identification management server will generate a digest based on any random service identification or data that is already used. The service identification management server will have all the access information and will generate a digest using the customizable digest generator. Since each PLSI service identification is unique the digest has to create the unique PLSI service identification. The digest reviews the database layer, reviews previous application changes, reviews user pervious application inputs, and any client identification information. The digest generator will randomly select from this data for the digest to add onto the PLSI service identification. As such, no individual knows what data is used on the digest and no individual will be able to predict the PLSI service identification and the data associated therewith. The PLSI service identification will be generated based on access request information, client identification, the generated digest, and access duration.

The PLSI service identification is send to the main entity server that will provide the PLSI service identification to the user. The user will then use the PLSI service identification, user access information, user network information, and the like.

Next, as illustrated in block 206, the process 200 continues by performing the PLSI handshake protocol. With the user having the PLSI service identification, the user may be able to initiate and utilizes PLSI login via the password less service identification management server for the entity. This is used instead of imputing a username and password and/or using a random password generator. As such, the user input appears as PLSI<Unique Server ID>Login. The request for validation of the PLSI service identification data is transmitted to the service identification management server. The service identification management server knows the digest and uses the PLSI service identification and the digest to decrypt the PLSI service identification. PLSI server will validate the PLSI service identification and extracts the information using the Digest. Once the PLSI service identification is decrypted, the service identification management server will gain access to the client identification accessing the server, the server that is trying to be accessed, the client workstation accessing the server. The service identification management server validates these items with the servers. The system generates a new encrypted connection for the user to access the critical computing infrastructure of the entity associated with the request. The encrypted connection encrypts all the data and commends that are executed via the connection with the user's digest. The user now has access to the critical computing infrastructure to perform the work associated with the access request. On successful acknowledgement, PLSI protocol layer will be established between the client and the access requested infrastructure and all the details will be encrypted with the generated digest. The PLSI server monitors all the request and response operation taking place during the access window. Because the connection is encrypted and all executed commands are tagged with the user's digest, the system does not allow the user to access databases or perform other commands outside of the access request.

Finally, as illustrated in block 208, the process 200 continues by performing the PLSI service identification destruction protocol. Once the window of time has expired or the user has logged out of the established session, the PLSI service identification will be destructed and will not be able to be validated again. The PLSI service identification can also be destructed using PLSI <Unique Service ID> Destruct.

FIG. 3 illustrates a process flow for the access initiation phase of the secure password less critical computing infrastructure access communication network protocol 300, in accordance with an embodiment of the invention. As discussed above the access initiation phase is the initiation of the request for access to a critical computing infrastructure for the entity. A user may request to access a critical computing infrastructure to perform a patch, maintenance, update, installation, or the like. The user will request access via the PLSI access management server. The access request is submitted by the user with information on which servers are planned to be accessed, what the assess is for, who the users are that are going to access the serves, and the client machine information associated with the access request. The client machine is the entity machine and entity network information that the user is using as the end-point device to make the request.

The process 300 is initiated by providing an access request 312 from the access request protocol initiation 302 to the PLSI access management server 304. The access request protocol initiation may come from and end-point device such as a client device or the like associated with the entity. The access request the user or client identification, client machine Internet Protocol (IP) address, and the requested server IP where the work is to be performed by the user. The PLSI access management server 304 sends the client identification for validation 314 to the client identification server 306. The client identification server 306 reviews the client identification, the client machine IP and the requested service to the servers to be performed and approves or denies the client identification for access based on whether the user is approved for that type of work, from the correct client computing device, at a correct time. The client identification may be approved 316.

The PLSI access management server 304 then transmits a communication to the network management server 308 of the entity to confirm a match of the client machine IP and the requested server IP for validation 318. The network management server 308 reviews the machine IP and requested server IP and approves the client machine IP and the requested server IP 320. Finally, the PLSI access management server 304 shares the approved access request information, official client identification, client machine IP, and requested server IP to the PLSI identification management server 310.

FIG. 4 illustrates a process flow for the PLSI service identification generation phase for the secure password less critical computing infrastructure access communication 400. As illustrated, the PLSI identification management server 404 transmits the access information 414 that it received in FIG. 3 to the service identification management server 406. The access information may comprise the approved access request information, the client identification, the client machine IP, and the requested server IP. The service identification management server 406 further comprises a customizable digest generator 410. The customizable digest generator 410 associated with the service identification management server 406 generates a digest based on any random service identification or data that is already used 412. The service identification management server 406 will have all the access information and will generate a digest using the customizable digest generator.

The service identification management server 406 generates the PLSI service identification 416 using access information and digest and provides it to the mail server 408. Since each PLSI service identification is unique the digest has to create the unique PLSI service identification. The digest reviews the database layer, reviews previous application changes, reviews user pervious application inputs, and any client identification information. The digest generator will randomly select from this data for the digest to add onto the PLSI service identification. The mail server 408 communicate the generated PLSI service identification 418 to the users 402.

FIG. 5 illustrates a process flow for the handshake phase of the secure password less critical computing infrastructure access communication network protocol 500, in accordance with an embodiment of the invention. With the user having the PLSI service identification, the user may be able to initiate and utilizes PLSI login via the password less service identification management server for the entity. This is used instead of imputing a username and password and/or using a random password generator. As illustrated the user using the user or the client system 502 performs a PLSI login request 512. This may include PLSI<Unique Service ID>Login. The login is transmitted to the PLSI management server 504. The PLSI management server 504 transmits a validation request 514 to validate the PLSI service identification data from the PLSI service identification request to the service identification management server 506. This can be done based on an extraction of the digest generated during the PLSI service identification generation phase. The service identification management server will approve the acknowledgement 516 back to the PLSI management server 504. The service identification management server 506 knows the digest and uses the PLSI service identification and the digest to decrypt the PLSI service identification. PLSI server will validate the PLSI service identification and extracts the information using the digest. Once the PLSI service identification is decrypted, the service identification management server 506 will gain access to the client identification accessing the server, the server that is trying to be accessed, the client workstation accessing the server.

The service identification management server 506 validates these items with the network management servers 508. The network management servers 508 transmit a request for revalidation of the client identification and the client and requested IP, 518 to the requested infrastructure 510. Upon approval acknowledgement between the PLSI management server 504 and the requested infrastructure 510, a session may be established 520. The session is shared with the user system 502. Once the user performs the PLSI longing 524 the session may initiate. The session may be a new encrypted connection for the user to access the critical computing infrastructure within the requested infrastructure 510 of the entity. The encrypted connection encrypts all the data and commends that are executed via the connection with the user's digest. The user now has access to the requested infrastructure 510 to perform the work associated with the access request, based on server access 522 and PLSI login 524.

During the server access the PLSI management server 504 preforms PLSI server monitoring 526 monitors all of the user actions on the servers by continually communication with the requested infrastructure 510. Because the connection is encrypted and all executed commands are tagged with the user's digest, the system does not allow the user to access databases or perform other commands outside of the access request. The user may proceed to access and perform the functions of the initial request. Upon completion or the completion of a set duration of time, the PLSI management server 504 or user may perform a PLSI logout 528. The PLSI service identification associated with this PLSI login may be destructed 530. The PLSI service identification may be destructed 532 based on logout or if an access duration has expired 534. The PLSI management server 504 may communicate with the service identification management server 506 to perform the PLSI service identification destruction 532.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for secure password less critical computing infrastructure access communication network protocol, the system comprising:

a communication network comprising a plurality of end-point devices;

at least non-transitory storage device;

a communication device; and a processing device operatively coupled to the at least one non-transitory storage device and the communication device, wherein the processing device is configured to execute the computer-readable program code to:

receive, from an end-point device of the plurality of end-point devices, a request for critical computing infrastructure access using password less service identification (PLSI) protocol from a user, wherein the access request comprises a client identification associated with the end-point device and a client Internet Protocol (IP) address;

validate the request for access based on at least an access duration associated with request, wherein validating the request for access comprises determining a match between the client IP address and the critical computing infrastructure;

in response to successful validation of the request for access, generate a PLSI service identification for the user from end-point device, wherein generating the PLSI service identification further comprises:

generating digest data associated with the end-point device comprising a database layer, prior application changes, and prior user input associated with the end-point device; and selecting a random portion of the digest data associated with the end-point device to add to the PLSI service identification, such that the PLSI service identification is unique to the request for access;

provide the PLSI service identification to the user, wherein the PLSI service identification comprises a tag with access request information, the client identification, the generated digest data, and the access duration;

in response to detecting the user's utilization of the PLSI service identification to access the critical computing infrastructure, perform a PLSI handshake protocol for validating access to the critical computing infrastructure;

generate, upon validation of the PLSI service identification, a new encrypted connection for the user to use the end-point device to access the critical computing infrastructure;

destruct the PLSI service identification upon detection of a logout of the user, completion of the new encrypted connection or upon a completion of a pre-determined amount of time, such that the PLSI service identification is incompatible with a subsequent validation; and prevent user access to the critical computing infrastructure outside of the request for access.

2. The system of claim 1, wherein generating the PLSI service identification for the user from the end-point device further comprises:

transmitting an access request number, the client identification, and the access duration to a service identification management server;

generating the digest data using a customizable digest generator;

tagging access request information, the client identification, the generated digest data, and the access duration to the PLSI service identification; and transmit the access request information to the end-point device of the user.

3. The system of claim 1, wherein the processing device is further configured to execute the computer-readable program code to allow the user to access the critical computing infrastructure via the new encrypted connection.

4. The system of claim 1, wherein generating the new encrypted connection for the user to use the end-point device to access the critical computing infrastructure further comprises:

encrypting all data and commands that are executed via the new encrypted connection with the generated digest data; and monitoring response operations taking place during the access duration by the user.

5. The system of claim 1, wherein the PLSI handshake protocol further comprises:

transmitting the PLSI service identification to a service identification management server to decrypt the PLSI service identification using the generated digest data; and validating the PLSI service identification and extracting data using the generated digest data.

6. The system of claim 1, wherein the request for critical computing infrastructure access is a request from the user associated with an entity and the request is for access to a database or server to perform maintenance or upgrading during a predetermined time period.

7. The system of claim 1, wherein the request for critical computing infrastructure access further comprises information on a server to be accessed, what is being performed on the critical computing infrastructure, user information, and the client machine information associated with the access request.

8. The system of claim 1, wherein transmitting the access request information to the end-point device of the user requires user input of PLSI<Unique Server ID>Login.

9. The system of claim 1, wherein the secure password less critical computing infrastructure access communication network protocol provides limited access to a full security layer of the critical computing infrastructure and creates a secure connection to: (1) independent internet-of-things (IOT) devices, (2) establish a secure connection between two or more autonomous IOT devices initiating, (3) establish secure connection on distributed cloud infrastructure, and/or (4) access node in block chain network to process the transaction.

10. A computer program product for secure password less critical computing infrastructure access communication network protocol, the computer program product comprising at least one non-transitory computer-readable medium having computer-readable program code portions embodied therein, the computer-readable program code portions comprising:

an executable portion configured to receive, from an end-point device of the plurality of end-point devices, a request for critical computing infrastructure access using password less service identification (PLSI) protocol from a user, wherein the access request comprises a client identification associated with the end-point device and a client Internet Protocol (IP) address;

an executable portion configured to validate the request for access based on at least an access duration associated with request, wherein validating the request for access comprises determining a match between the client IP address and the critical computing infrastructure;

an executable portion configured to, in response to successful validation of the request for access, generate a PLSI service identification for the user from end-point device, wherein generating the PLSI service identification further comprises:

generating digest data associated with the end-point device comprising a database layer, prior application changes, and prior user input associated with the end-point device; and selecting a random portion of the digest data associated with the end-point device to add to the PLSI service identification, such that the PLSI service identification is unique to the request for access;

an executable portion configured to provide the PLSI service identification to the user, wherein the PLSI service identification comprises a tag with access request information, the client identification, the generated digest data, and the access duration;

an executable portion configured to, in response to detecting the user's utilization of the PLSI service identification to access the critical computing infrastructure, perform a PLSI handshake protocol for validating access to the critical computing infrastructure;

an executable portion configured to generate, upon validation of the PLSI service identification, a new encrypted connection for the user to use the end-point device to access the critical computing infrastructure;

an executable portion configured to destruct the PLSI service identification upon detection of a logout of the user, completion of the new encrypted connection or upon a completion of a pre-determined amount of time, such that the PLSI service identification is incompatible with a subsequent validation; and an executable portion configured to prevent user access to the critical computing infrastructure outside of the request for access.

11. The computer program product of claim 10, wherein generating the PLSI service identification for the user from the end-point device further comprises:

transmitting an access request number, the client identification, and the access duration to a service identification management server;

generating the digest data using a customizable digest generator;

tagging access request information, the client identification, the generated digest data, and the access duration to the PLSI service identification; and transmit the access request information to the end-point device of the user.

12. The computer program product of claim 10, wherein the computer-readable program code further comprises an executable portion configured to allow the user to access the critical computing infrastructure via the new encrypted connection.

13. The computer program product of claim 10, wherein generating the new encrypted connection for the user to use the end-point device to access the critical computing infrastructure further comprises;

encrypting all data and commands that are executed via the new encrypted connection with the generated digest data; and monitoring response operations taking place during the access duration by the user.

14. The computer program product of claim 10, wherein the PLSI handshake protocol further comprises:

transmitting the PLSI service identification to a service identification management server to decrypt the PLSI service identification using the generated digest data; and validating the PLSI service identification and extracting data using the generated digest.

15. The computer program product of claim 10, wherein the request for critical computing infrastructure access is a request from the user associated with an entity and the request is for access to a database or server to perform maintenance or upgrading during a predetermined time period.

16. The computer program product of claim 10, wherein the request for critical computing infrastructure access further comprises information on a server to be accessed, what is being performed on the critical computing infrastructure, user information, and the client machine information associated with the access request.

17. A method for secure password less critical computing infrastructure access communication network protocol, the method comprising:

receiving a request, from an end-point device of the plurality of end-point devices, for critical computing infrastructure access using password less service identification (PLSI) protocol from a user, wherein the access request comprises a client identification associated with the end-point device and a client Internet Protocol (IP) address;

validating the request for access based on at least an access duration associated with request, wherein validating the request for access comprises determining a match between the client IP address and the critical computing infrastructure;

in response to successful validation of the request for access, generating a PLSI service identification for the user from end-point device, wherein generating the PLSI service identification further comprises:

generating digest data associated with the end-point device comprising a database layer, prior application changes, and prior user input associated with the end-point device; and selecting a random portion of the digest data associated with the end-point device to add to the PLSI service identification, such that the PLSI service identification is unique to the request for access;

providing the PLSI service identification to the user, wherein the PLSI service identification comprises a tag with access request information, the client identification, the generated digest data, and the access duration;

in response to detecting the user's utilization of the PLSI service identification to access the critical computing infrastructure, performing a PLSI handshake protocol for validating access to the critical computing infrastructure;

generating, upon validation of the PLSI service identification, a new encrypted connection for the user to use the end-point device to access the critical computing infrastructure;

destructing the PLSI service identification upon detection of a logout of the user, completion of the new encrypted connection or upon a completion of a pre-determined amount of time, such that the PLSI service identification is incompatible with a subsequent validation; and preventing user access to the critical computing infrastructure outside of the request for access.

18. The method of claim 17, wherein generating the PLSI service identification for the user from the end-point device further comprises:

transmitting an access request number, the client identification, and the access duration to a service identification management server;

generating the digest data using a customizable digest generator;

tagging access request information, the client identification, the generated digest data, and the access duration to the PLSI service identification; and transmit the access request information to the end-point device of the user.

19. The method of claim 17, wherein the method further comprises allowing the user to access the critical computing infrastructure via the new encrypted connection.

20. The method of claim 17, wherein generating the new encrypted connection for the user to use the end-point device to access the critical computing infrastructure further comprises;

encrypting all data and commands that are executed via the new encrypted connection with the generated digest data; and monitoring response operations taking place during the access duration by the user.

* * * * *